(12) United States Patent
Trimberger

(10) Patent No.: US 10,505,971 B1
(45) Date of Patent: Dec. 10, 2019

(54) PROTECTING LOCAL NETWORK DEVICES AGAINST ATTACKS FROM REMOTE NETWORK DEVICES

(71) Applicant: Xilinx, Inc., San Jose, CA (US)

(72) Inventor: Stephen M. Trimberger, Incline Village, NV (US)

(73) Assignee: XILINX, INC., San Jose, CA (US)

(*) Notice: Subject to any disclaimer, the term of this patent is extended or adjusted under 35 U.S.C. 154(b) by 377 days.

(21) Appl. No.: 15/345,332

(22) Filed: Nov. 7, 2016

(51) Int. Cl.
H04L 29/06 (2006.01)
H04L 29/08 (2006.01)
H04L 12/26 (2006.01)

(52) U.S. Cl.
CPC ...... H04L 63/1441 (2013.01); H04L 43/0852 (2013.01); H04L 63/0869 (2013.01); H04L 63/126 (2013.01); H04L 67/18 (2013.01); G06F 2221/2151 (2013.01)

(58) Field of Classification Search
CPC .................................................. H04L 63/1441
USPC ........................................................... 726/22
See application file for complete search history.

(56) References Cited

U.S. PATENT DOCUMENTS

| | | | | |
|---|---|---|---|---|
| 7,082,463 B1 * | 7/2006 | Bradley | .............. | H04L 41/5003 709/223 |
| 7,576,754 B1 * | 8/2009 | Joseph | ................... | G01C 21/32 345/619 |
| 7,596,808 B1 * | 9/2009 | Wilkinson | .......... | H04L 63/0272 709/223 |
| 7,725,934 B2 * | 5/2010 | Kumar | ................ | H04L 63/0245 726/22 |
| 8,844,040 B2 * | 9/2014 | Harris | ..................... | H04L 63/08 713/151 |
| 9,160,755 B2 * | 10/2015 | Chasin | ................... | H04L 63/126 |
| 2013/0152187 A1 * | 6/2013 | Strebe | ................... | H04L 63/101 726/11 |
| 2014/0304810 A1 * | 10/2014 | Khanal | ............... | H04L 63/1466 726/22 |
| 2015/0244617 A1 * | 8/2015 | Nakil | .................. | G06F 9/45558 709/224 |
| 2015/0382143 A1 * | 12/2015 | Lindskog | .............. | H04W 4/023 455/456.1 |
| 2017/0085537 A1 * | 3/2017 | Benedek | ............. | H04L 63/0435 |
| 2017/0251068 A1 * | 8/2017 | Kappler | .................. | H04L 67/18 |
| 2017/0325094 A1 * | 11/2017 | Lee | ........................ | H04W 12/04 |

* cited by examiner

Primary Examiner — Khalil Naghdali
(74) Attorney, Agent, or Firm — LeRoy D. Maunu

(57) ABSTRACT

Disclosed approaches for protecting against attacks on a network device, a second network device receives a first message from a first network device. In response to the first message, the second network device determines a first area from which the first network device issued the message. The second network device determines whether or not the first area intersects a second area having the second network device. In response to determining that the first area intersects the second area, the second network device acknowledges the first message to the first network device. In response to determining that the first area does not intersect the second area, the second network device rejects the first message.

18 Claims, 5 Drawing Sheets

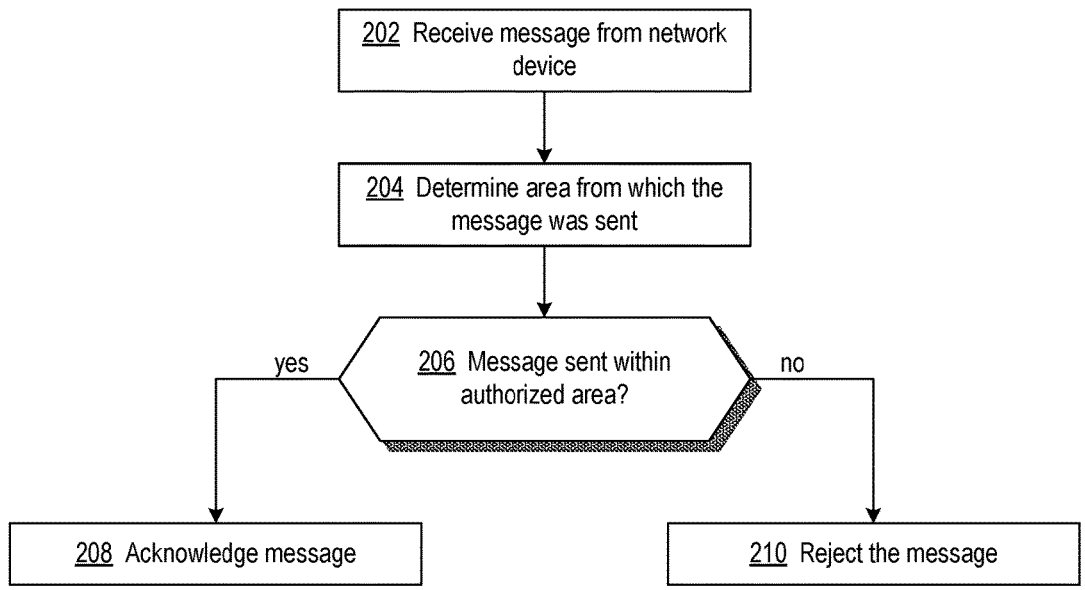
FIG. 2
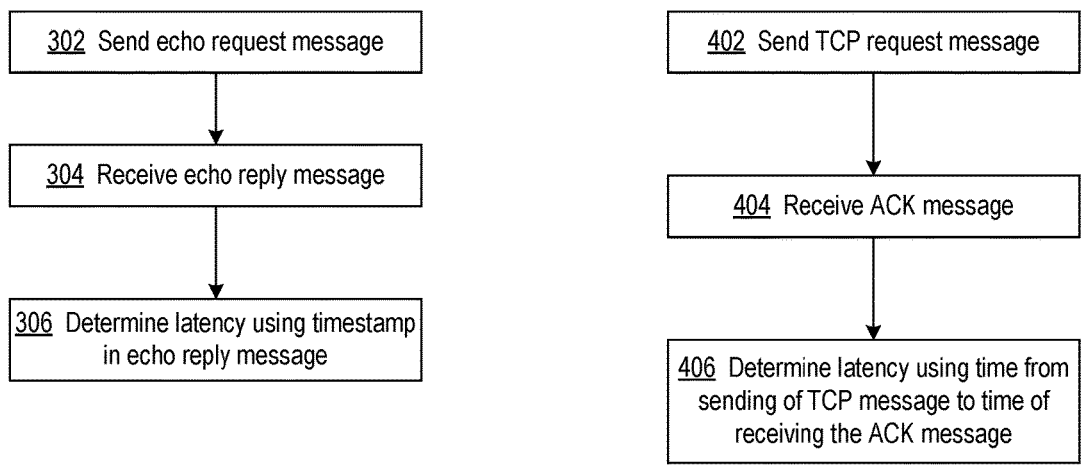
FIG. 3
FIG. 4

US 10,505,971 B1

PROTECTING LOCAL NETWORK DEVICES AGAINST ATTACKS FROM REMOTE NETWORK DEVICES

TECHNICAL FIELD

The disclosure generally relates to protecting local network devices against attacks from remote network devices.

BACKGROUND

As society is becoming increasingly dependent on electronic devices, the information accessible through these devices is becoming increasingly lucrative to attackers. Many people have multiple devices, such as smart phones, tablet computers, notebook computers, desktop computers, and network attached storage systems. Information on financial accounts, medical records, emails, business documents may be stored on or accessible through one or more of a user's devices. Whereas the goal of many attacks in the past has been simply to render a device inoperable, the importance of the information accessible on users' devices and the number of devices having access to that information has led to more sophisticated attacks that range from encrypting data on a device and holding the device hostage to extracting valuable data from a user's device to the attacker's equipment.

Firewalls, access controls, intrusion detection encryption are but some of the measures employed to protect against unauthorized access to a network device. Even with protection that is generally recognized as adequate, skilled attackers may break through protection mechanisms or exploit vulnerabilities and gain access to a network device. As the level of connectedness increases with proliferation of the Internet of Things (IoT), protecting against unauthorized access to a network device will continue to increase in importance.

SUMMARY

In a method of protecting against attacks on a network device, a second network device receives a first message from a first network device. In response to the first message, the second network device determines a first area from which the first network device issued the message. The second network device determines whether or not the first area intersects a second area having the second network device. In response to determining that the first area intersects the second area, the second network device acknowledges the first message to the first network device. In response to determining that the first area does not intersect the second area, the second network device rejects the first message.

A system includes a processor and a memory coupled to the processor.

The memory is configured with instructions for protecting against network attacks on the processor. The instructions when executed by the processor cause the processor to receive a first message from a network device. The processor determines, in response to the first message, a first area from which the first network device issued the message. The processor determines whether or not the first area intersects a second area having the processor and memory. In response to determining that the first area intersects the second area, the processor acknowledges the first message to the first network device. In response to determining that the first area does not intersect the second area, the processor rejects the first message.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 2 is a flowchart of a process of restricting incoming messages to a local network device according to the approximate location of the sender;

FIG. 3 is a flowchart of an exemplary process for determining the latency of a network message from a remote network device to a local network device or router using echo-reply messages;

FIG. 4 is a flowchart of an exemplary process for determining the latency of a network message from a sender to a local network device or router using TCP request-acknowledge messages;

DETAILED DESCRIPTION

Figure 1:
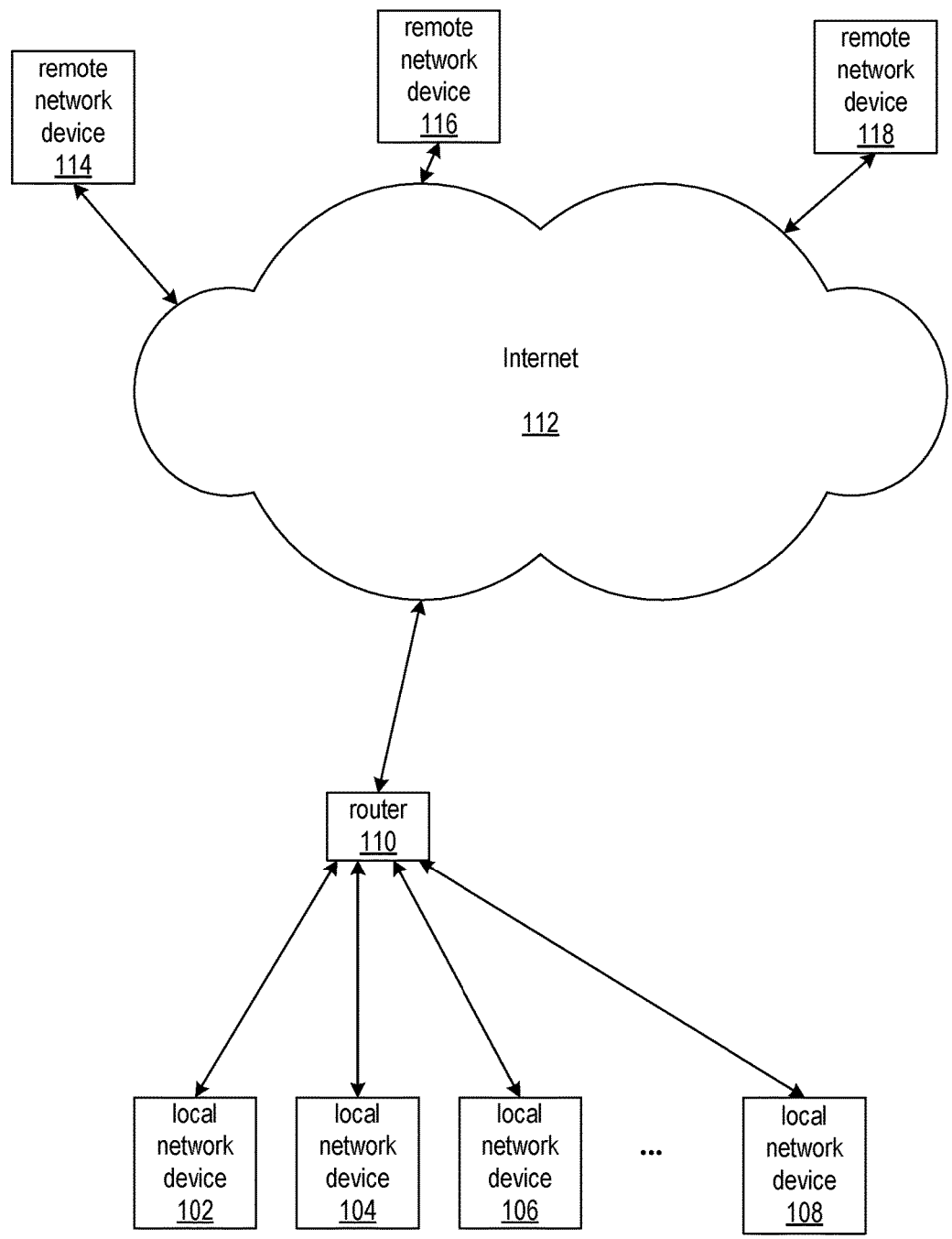
FIG. 1 shows local network devices that are coupled to a wider network, such as the Internet, via a local router.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The Internet has made communication over vast distances fast and ubiquitous, which has been a boon for many applications. However, widespread connectivity has exposed network devices to attackers who may be located anywhere in the world. Though communication between a local network device and some remote network devices may be acceptable or even desirable for some applications, some applications contemplate localized control in most scenarios and only occasional remote control. For example, as the IoT grows to include industrial systems and household devices, control of the devices is generally contemplated to be local.

In an effort to reduce susceptibility of local network devices to attacks from remote network devices, before a local network device accepts and processes an incoming message, the local network device determines the approximate location of the sending device ("sender"). If the sender is within a certain distance from the local network device, the local network device accepts and processes the message.

If the sender is not within the certain distance from the local network device, the local network device rejects the message.

FIG. 1 shows local network devices that are coupled to a wider network, such as the Internet, via a local router. The local network devices 102, 104, 106, . . . 108 can include desktop computers, notebook computers, tablets, smartphones, and servers, as well as industrial equipment and household appliances that that can be categorized under the umbrella term, Internet of Things (IoT). The local network devices may have wired or wireless connections to the router 110.

The router 110 generally forwards packets (or "messages") from the one computer network to another computer network. In an exemplary application, the router forwards messages between a LAN, which connects the local network devices and the Internet 112. Routers range in capabilities from connecting a home network to the Internet through an Internet service provider, to routers that connect large businesses or ISP networks to core routers along the backbone of the Internet. Routers can be implemented as hardware-based or software-based devices. Routers can include security functions, eliminating some packets or preventing undesirable communications.

Remote network devices, such as network devices 114, 116, and 118, can connect to the Internet through respective LANs and routers (not shown). A remote network device can initiate contact to a local network device under a variety of different protocols. Example protocols include the Internet Protocol (IP), Transmission Control Protocol (TCP), Hyper Text Transfer Protocol (HTTP), File Transfer Protocol (FTP), User Datagram Protocol (UDP), Internet Control Message Protocol (ICMP), Simple Mail Transport Protocol (SMTP), Simple Network Management Protocol (SNMP), and Telnet. Most of the protocols include request messages and acknowledge messages sent between the communicating devices, and the messages specify a source address of the sending device and a destination of the intended receiving device.

The disclosed methods and systems generally restrict access by the remote network devices to a local network device by way of the router or the local network devices limiting access from those remote network devices that are proximate the local network devices. The proximity of a remote network device generally implies an area within which the sender is located and indicates an approximate location of the device or distance of the remote network device from the local network device. The latency of network messages can be used to estimate the proximity of a remote network device to the addressed local network device. A message having a low latency generally suggests that the sender is closer to the local network device than the sender of a message having a greater latency.

A network device, such as either the local network devices 102, 104, 106, or 108 or the router 110, can restrict incoming messages to those senders that are within a certain area, such as the area occupied by the local network devices on a LAN, and approaches for determining the location of a sender generally indicate an area within which the sender is located and not the precise location. Thus, if the area occupied by the sender does not intersect the permitted area, the message can be rejected. If the area occupied by the sender does intersect the permitted area, the message can be acknowledged by the remote network device or forwarded to the local network device by a router, depending on the implementation. The disclosure uses the term, "network device" to refer to the components connected to the network that can be configured to restrict network messages. Thus, network device refers to the local network devices 102, 104, 106, . . . 108, the router 110, and to other devices in the network that handle and/monitor messages in the network.

FIG. 2 is a flowchart of a process of restricting incoming messages to a local network device according to the approximate location of the sender. At block 202, a network device receives a message that is addressed to a local network device. At block 204, the network device determines the area from which the message was sent. The area of the sender can be determined by examining the latency of a message sent from the sender to the local network device/router. The area of the sender can be determined by the content of the message that includes information reporting the geographical location of the sender. This information may be latitude and longitude, or political entity (country) of origin and may be attested or guaranteed as authentic by a trusted party. As explained in more detail below, the latency can be determined using an echo-reply message protocol or request-acknowledge message protocol.

The latency of the message indicates an approximate area within which the sender is located. Network messages sent to a local network device from within an "authorized area," which is generally an area proximate the local network device, can be processed by the addressed local network device. Network messages sent to a local network device from outside the authorized area can be rejected.

At decision block 206, the network device determines whether or not the message was sent from within the authorized area. The magnitude of the latency can indicate whether or not the message was sent from the authorized area. As the magnitude of the latency indicates an approximate area, if the approximate area intersects the authorized area, the message is considered to have been sent from within the authorized area. In an exemplary implementation, if the latency is less than a threshold value, the message is considered to have been sent from within the authorized area.

If the message was sent from within the authorized area, a router forwards the message to the local network device in a router implementation, and the local network device sends an acknowledge message to the sender at block 208. In conjunction with sending the acknowledge message, the router/local network device can be configured to select one authentication method from multiple authentication methods based on proximity of the area from which the message was sent to the authorized area. The selected authentication method can be performed between the network device that sent the message and the router/local network device. For example, one authentication method may be a forced login procedure if the area from which the message was sent intersects the authorized area but is outside a local area network. If the message was sent from within the local area network, the selected authentication method may be to bypass the login procedure.

If the message was not sent from within the authorized area, the network device can reject the message at block 210. In one implementation, rejection entails not acknowledging the message with any type of response and not processing the message. In another implementation, rejection entails sending a rejection message or negative acknowledgment to the sender.

FIG. 3 is a flowchart of an exemplary process for determining the latency of a network message from a remote network device to a network device using echo-reply messages. In one implementation, an echo-reply message protocol is implemented by the ping program. For example, at block 302 the "ping" program, executing on the network device, uses the ICMP and sends an echo request message to the network device that previously sent a network message (the message referenced in FIG. 2, block 202). The sender responds with an echo reply message, which is received by the ping program at block 304. At block 306, the network device determines the latency from a timestamp in the echo reply message. The latency can be calculated as the difference between the value of the timestamp and the time at which the echo-reply message was received.

FIG. 4 is a flowchart of an exemplary process for determining the latency of a network message from a sender to a network device using TCP request-acknowledge messages. TCP messages include sequence numbers, which can be used to match acknowledge messages to corresponding request messages. The request and acknowledge message pair can be used to determine latency.

At block 402, the network device sends a TCP request message to the network device that previously sent a network message (the message referenced in FIG. 2, block 202) and stores a first timestamp indicating the time at which the TCP request message was sent. At block 404, the network device receives an acknowledge message (ACK) that corresponds to the TCP request message and stores a second timestamp indicating the time at which the ACK was received. At block 406, the latency can be determined using the two timestamps. As the difference between the two timestamps indicates the combined latency of the TCP request message from the network device to the sender and the ACK message from the sender to the network device, the latency of the ACK message can be estimated as one-half the difference between the two timestamps.

Figure 5:
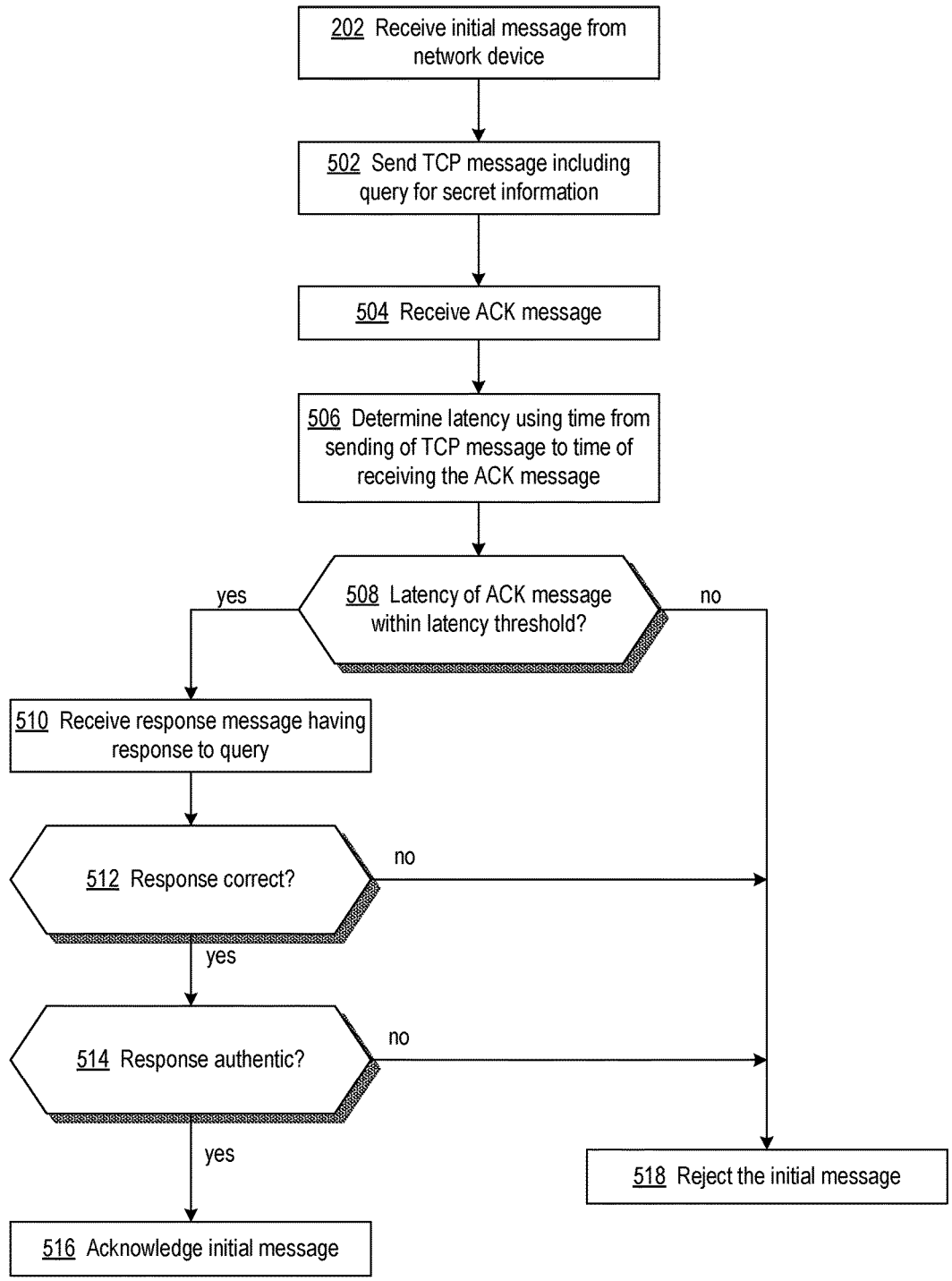
FIG. 5 shows a flowchart of a process of restricting incoming messages to a local network device based on the latency of TCP request-acknowledge messages and using authentication techniques to prevent spoofing of ACK messages.

FIG. 5 shows a flowchart of a process of restricting incoming messages to a local network device based on the latency of TCP request-acknowledge messages and using authentication techniques to prevent spoofing of ACK messages. At block 202, the network device receives an incoming message as described above.

The network device at block 502 formulates a query for secret information, sends a TCP request message having the query to the sender of the incoming message, and stores a first timestamp. The purpose of the query for the secret information is that the response will indicate that the sender actually received the query. In an exemplary implementation, the query may include a random number, and the expected response an arithmetic function of the random number, such as adding 1 to the random number.

At block 504, the network device receives the ACK message to the TCP request message having the query and stores a second timestamp. Note that the ACK message is an acknowledgement that the TCP request message was received and not a reply to the query for the secret information. At block 506, the network device determines the latency using the two timestamps as described above.

The network device determines whether the latency of the ACK message is less than a latency threshold at decision block 508. If the ACK message latency is less than the threshold, at block 510, the network device receives the response to the TCP request message having the query. If the network device/router determines that the response message contains the correct secret information at decision block 512, the process proceeds to decision block 514.

As another authentication measure, the network device/router may further require the sender to sign the response (to the TCP request message having the query) using the sender's public key as further proof of the sender's identity. If the network device determines at decision block 514 that the response is authentic, the network device send and acknowledge message to the initial message (the message received at block 202).

If the latency of the ACK message was not less than the latency threshold (decision block 508), or if the information provided in the response message is not the secret information (decision block 512), or the response message was not authentic (decision block 514), the network device rejects the initial message (message of block 202) at block 518.

The disclosed methods and systems can be implemented as a System on Chip (SOC), programmable logic, or an ASIC within a router or other network device or on stationary or mobile computing device such as a wearable device, smartphone, tablet computer, notebook computer, desktop computer, server computer, or any computing device disposed within the IoT.

Figure 6:
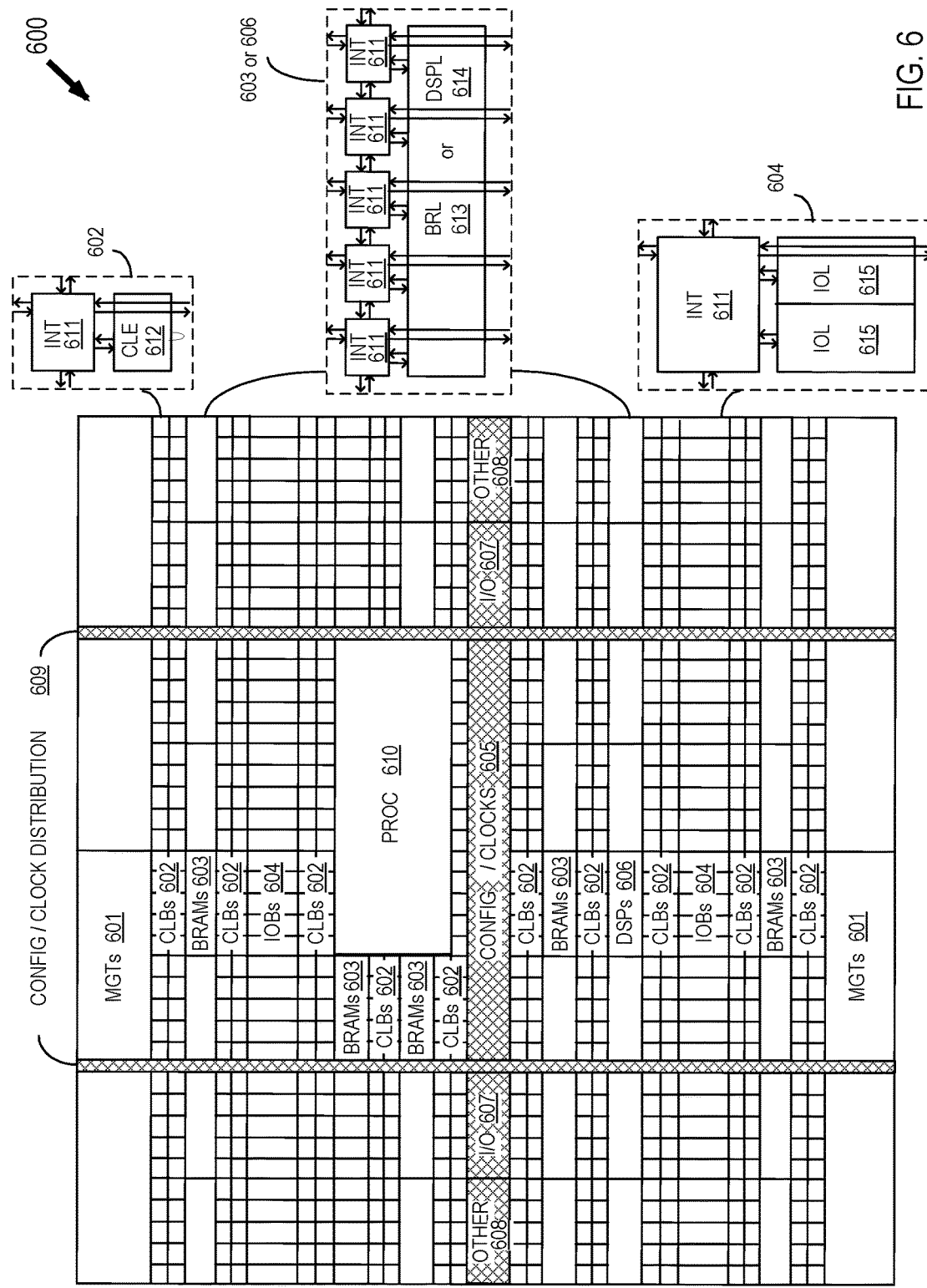
FIG. 6 shows a programmable integrated circuit (IC) on which the disclosed circuits and processes may be implemented.

FIG. 6 shows a programmable integrated circuit (IC) 600 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable ICs having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL) 614 in addition to an appropriate number of programmable interconnect elements. An 10B 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual programmable IC, more than one adjacent column of CLBs is typically included wherever the CLBs appear, to facilitate the efficient implementation of user logic.

Figure 7:
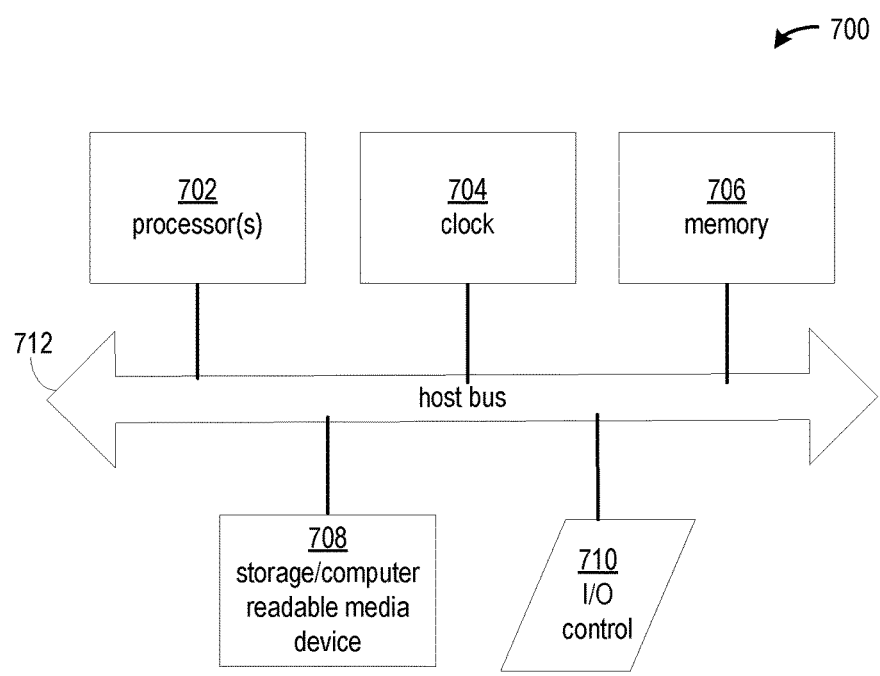
FIG. 7 shows a block diagram of an example computing arrangement that may be configured to implement the processes described herein.

FIG. 7 shows a block diagram of an example computing arrangement that may be configured to implement the processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory arrangement 706, a storage arrangement 708, and an input/output control unit 710, all coupled to a host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 702 may be one or more general purpose processors, or a combination of one or more general purpose processors and suitable co-processors, or one or more specialized processors (e.g., RISC, CISC, pipelined, etc.).

The memory arrangement 706 typically includes multiple levels of cache memory, and a main memory. The storage arrangement 708 may include local and/or remote persistent storage, such as provided by magnetic disks (not shown), flash, EPROM, or other non-volatile data storage. The storage unit may be read or read/write capable. Further, the memory arrangement 706 and storage arrangement 708 may be combined in a single arrangement.

The processor(s) 702 executes the software in storage arrangement 708 and/or memory arrangement 706, reads data from and stores data to the storage arrangement 708 and/or memory arrangement 706, and communicates with external devices through the input/output control arrangement 710. These functions are synchronized by the clock signal generator 704. The resource of the computing arrangement may be managed by either an operating system (not shown), or a hardware control unit (not shown).

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for protecting against attack from remote network devices. Other aspects and features will be apparent to those skilled in the art from consideration of the specification. The methods and systems may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of protecting against attacks on a network device, comprising:
    receiving a first message from a remote network device at a router, wherein the first message is addressed to a local network device;
    determining by the router, in response to the first message, a first area from which the remote network device issued the first message, wherein the determining the first area includes determining a latency of a message from the remote network device to the router;
    determining whether or not the first area intersects a second area having the local network device;
    acknowledging the first message to the first network device in response to determining that the first area intersects the second area; and
    rejecting the first message in response to determining that the first area does not intersect the second area.

2. The method of claim 1, wherein the determining the latency includes:
    sending an echo request from the router to the remote network device;
    receiving by the router an echo reply from the remote network device; and
    determining by the router the latency from a timestamp in the echo reply.

3. The method of claim 1, wherein the determining latency includes:
    sending a transmission control protocol (TCP) message from the router to the remote network device;
    receiving by the router from the remote network device, an acknowledge message associated with the TCP message; and
    determining by the router the latency from a time that the TCP message was sent and a time that the acknowledge message was received.

4. The method of claim 3, further comprising:
wherein the sending the TCP message includes specifying in the TCP message a query for secret information;
determining by the router, in response to a second message from the remote network device, whether or not the second message includes the secret information;
acknowledging the first message by the router to the remote network device in response to determining that the second message includes the secret information; and
rejecting the first message by the router in response to determining that the second message does not include the secret information.

5. The method of claim 4, further comprising:
determining by the router whether the second message was sent from a known sender;
acknowledging the second message to the remote network device by the router in response to determining that the second message includes the secret information and was sent by the known sender; and
rejecting the second message by the router in response to determining that the second message does not include the secret information or was not sent by the known sender.

6. The method of claim 4, wherein the specifying in the TCP message the query for secret information includes specifying a random number in the TCP message.

7. The method of claim 6, wherein the determining whether or not the second message includes the secret information includes determining whether or not the second message specifies an arithmetic function of the random number.

8. The method of claim 1, wherein the rejecting includes ignoring the first message by the router.

9. The method of claim 1, further comprising:
selecting one authentication method from a plurality of authentication methods based on proximity of the first area to the second area; and
performing the one authentication method between the remote network device and the router.

10. A system comprising:
a processor coupled to a network;
a memory coupled to the processor and configured with instructions for protecting against network attacks on the processor, the instructions when executed by the processor causing the processor to perform operations including:
  receiving a first message from a remote network device, wherein the first message is addressed to a local network device;
  determining, in response to the first message, a first area from which the remote network device issued the first message, wherein the instructions for determining the first area include instructions for determining a latency of a message from the remote network device to the processor;
  determining whether or not the first area intersects a second area having the local network device;
  acknowledging the first message to the remote network device in response to determining that the first area intersects the second area; and
  rejecting the first message in response to determining that the first area does not intersect the second area.

11. The system of claim 10, wherein the instructions for determining the latency include instructions that when executed by the processor cause the processor to perform operations including:
  sending an echo request to the remote network device;
  receiving an echo reply from the remote network device; and
  determining the latency from a timestamp in the echo reply.

12. The system of claim 10, wherein the instructions for determining the latency include instructions that when executed by the processor cause the processor to perform operations including:
  sending a transmission control protocol (TCP) message to the remote network device;
  receiving from remote the network device, an acknowledge message associated with the TCP message; and
  determining the latency from a time that the TCP message was sent and a time that the acknowledge message was received.

13. The system of claim 12, wherein the instructions for transmitting the TCP message include instructions for specifying in the TCP message a query for secret information, and the memory is configured with further instructions that when executed by the processor cause the processor to perform operations including:
  determining, in response to a second message from the remote network device, whether or not the second message includes the secret information;
  acknowledging the first message to the remote network device in response to determining that the second message includes the secret information; and
  rejecting the first message in response to determining that the second message does not include the secret information.

14. The system of claim 13, wherein the memory is configured with further instructions that when executed by the processor cause the processor to perform operations including:
  determining whether the second message was sent from a known sender;
  acknowledging the second message to the remote network device in response to determining that the second message includes the secret information and was sent by the known sender; and
  rejecting the second message in response to determining that the second message does not include the secret information or was not sent by the known sender.

15. The system of claim 13, wherein the instructions for specifying in the TCP message the query for secret information include instructions for specifying a random number in the TCP message.

16. The system of claim 15, wherein the instructions for determining whether or not the second message includes the secret information include instructions for determining whether or not the second message specifies an arithmetic function of the random number.

17. The system of claim 10, wherein the instructions for rejecting include instructions for ignoring the first message by the processor.

18. The system of claim 10, wherein the memory is configured with further instructions that when executed by the processor cause the processor to perform operations including:
  selecting one authentication method from a plurality of authentication methods based on proximity of the first area to the second area; and
  performing the one authentication method between the remote network device and the processor.

* * * * *